(12) United States Patent
Wallace et al.

(10) Patent No.: US 8,201,214 B1
(45) Date of Patent: Jun. 12, 2012

(54) AD-HOC USER ACCOUNT CREATION

(75) Inventors: Leland A. Wallace, San Jose, CA (US); David M. O'Rourke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 994 days.

(21) Appl. No.: 11/240,031

(22) Filed: Sep. 30, 2005

(51) Int. Cl.
G06F 17/30 (2006.01)
H04L 9/32 (2006.01)

(52) U.S. Cl. .............. 726/2; 726/27; 726/28; 726/29; 726/30; 713/170

(58) Field of Classification Search .......... 713/182–185, 713/156, 159, 166, 172, 176; 726/3, 20, 726/27–29, 2; 380/228–229, 232, 283, 285, 380/45
See application file for complete search history.

(56) References Cited

U.S. PATENT DOCUMENTS

| | | | |
|---|---|---|---|
| 5,421,011 A | 5/1995 | Camillone et al. | |
| 5,671,354 A | 9/1997 | Ito et al. | |
| 5,983,273 A | 11/1999 | White et al. | |
| 6,065,054 A | 5/2000 | Dutcher et al. | |
| 6,092,199 A | 7/2000 | Dutcher et al. | |
| 6,144,959 A * | 11/2000 | Anderson et al. | 707/9 |
| 6,182,142 B1 * | 1/2001 | Win et al. | 709/229 |
| 6,268,405 B1 | 7/2001 | Yao et al. | |
| 6,449,642 B2 | 9/2002 | Bourke-Dunphy et al. | |
| 7,320,068 B2 | 1/2008 | Zimniewicz et al. | |
| 7,366,906 B2 * | 4/2008 | Enokida | 713/175 |
| 7,401,149 B2 | 7/2008 | Davis, III et al. | |
| 7,493,374 B2 | 2/2009 | Cross et al. | |
| 7,496,760 B2 | 2/2009 | Banks-Binici et al. | |
| 2002/0116647 A1 * | 8/2002 | Mont et al. | 713/201 |
| 2003/0051145 A1 * | 3/2003 | Jackson et al. | 713/182 |
| 2003/0145237 A1 * | 7/2003 | Chang et al. | 713/202 |
| 2004/0210767 A1 * | 10/2004 | Sinclair et al. | 713/201 |
| 2005/0149481 A1 * | 7/2005 | Hesselink et al. | 707/1 |
| 2005/0216768 A1 | 9/2005 | Eppert | |
| 2007/0033148 A1 * | 2/2007 | Cahill | 705/65 |
| 2007/0180504 A1 | 8/2007 | Hung et al. | |
| 2008/0130524 A1 | 6/2008 | Volach et al. | |

FOREIGN PATENT DOCUMENTS

WO   WO 2004111809 A1 * 12/2004

OTHER PUBLICATIONS

"An Authenticated Broadcasting Scheme for Wireless Ad hoc Network"; Bohio et al.; IEEE; Mar. 21, 2004.*
"Generating authentication data without keeping a private key for Mobility" ; Yang et al.; IEEE; Jul. 22, 2005.*

* cited by examiner

*Primary Examiner* — Taghi Arani
*Assistant Examiner* — Mohammad Rahman
(74) *Attorney, Agent, or Firm* — Gazdzinski & Associates, PC

(57) ABSTRACT

A mechanism that allows a user to easily configure a rules engine to apply rules to decide which requests for access to a user's computer resources are to be granted and which are denied. A trusted token, such as a certificate of identity issued by a trusted third party authority that verifies identities of computer users, is included in a calling card object provided by the requesting user to the (server) computer that controls the resources desired by the requester. Additional conditions for access may be specified as desired by the user of the server computer.

14 Claims, 4 Drawing Sheets

AD-HOC USER ACCOUNT CREATION

FIELD

The present invention relates broadly to computer networks. Specifically, the present invention relates to computers automatically negotiating a level of trust required before one computer serves assets to another computer.

BACKGROUND

Proliferation of portable computers and computer networks has drastically widened the scope of computer usage for the average computer user. Access to computer networks is now offered in such public venues as coffee shops, hotels, and other places where people connect to a network in a casual or ad-hoc manner, for example, a one-time connection or multiple connections over a brief period. However, establishing connections between individual computers connected in this ad-hoc manner has not evolved with this expanded access. For online communication, individual users still must use third party resources, such as websites that host multiple users, to share resources or even to facilitate communication. In these conventional resource-sharing environments, a user must still establish an account through a largely mechanical process on the client end, where a user approaches a website by first asking for an account to be created, and then engaging in a dialogue where the user either supplies a username and password, or is assigned the username and password from the server asked to create an account.

As computing power has evolved, even the simplest of computers sold today can function as servers and distribute computing resources and assets to other computers. However, the average computer user has no easy way to validate the identity of another user requesting access, and ad-hoc user account creation suffers a serious shortcoming from the perspective of security. There also is no simple way for one computer to share resources unless either a third party entity is involved, or the computer users manually share resources. Most computer users are not interested in performing manual account creation for everyone who wants access to his or her computer resources. Also, varying levels of scrutiny to access requests currently are insufficient for the average user. Where an individual user may not require a high level of scrutiny for someone wishing to access a collection of stored computer images or photographs, a higher degree of security may be desired for more sensitive information that a computer user may only wish to share with select individuals.

Thus there remains a significant need for a mechanism for computer users that provides security and automation in a resource-sharing environment that is easily configured by a user.

SUMMARY

The present invention solves the problems described above by providing a mechanism that allows a user to easily configure a rules engine that applies rules to decide which requests for access to a user's computer resources are to be granted and which are denied. In an embodiment, a trusted token, such as a certificate of identity issued by a trusted third party authority that verifies identities of computer users, can be included as part of an electronic calling card provided by the requesting user to the (server) computer that controls the resources desired by the requester. Additional conditions for access may be specified as desired by the user of the server computer.

In one aspect, the present invention provides a method for a first computer to access a second computer, by establishing a connection between a first and second computer and passing from the first computer to the second computer a trusted token indicating an identity of a user. The second computer then establishes an identity-based account based on the trusted token received from the first computer. In an embodiment, the trusted token is a token issued by an identity-verification authority, and identifies the user by name. In an embodiment, the trusted token is an electronic certificate issued by an identity-verification authority and includes an encrypted key and a user-configurable portion containing information provided by the user. The identity-based account is established in a manner characterized by an absence of interaction between the second computer and a user of the first computer. Once trust is established between the first computer and the second computer, the second computer fulfills resource requests made by the first computer.

In another aspect, the present invention provides a computer-readable medium containing instructions which, when executed by a computer, engage a first computer in communication with a second computer, by receiving a resource request from a first computer over a computer network; engaging a rules engine to apply a set of criteria to the request received from the first computer; denying the resource request if a criterion in the set is not satisfied; receiving a trusted token from the first computer; engaging an identity verification module to read a trusted token received from the first computer; establishing an identity based on the trusted token; and fulfilling the resource request received from the first computer.

In yet another aspect, the present invention provides an interface that allows a user to specify rules to be applied by a rules engine in evaluating a request for access made when the user of another computer initiates contact by sending a calling card having a digital certificate indicating the human identity of the user as well as other information that can be evaluated by a rules engine to determine whether or not to grant access to the requesting user. The interface also allows a user to specify rules that determine what information is provided on the calling card presented to other computers.

Many other features and advantages of the present invention will be realized upon reading the following detailed description, when considered in conjunction with the accompanying drawings.

DETAILED DESCRIPTION

Figure 1:
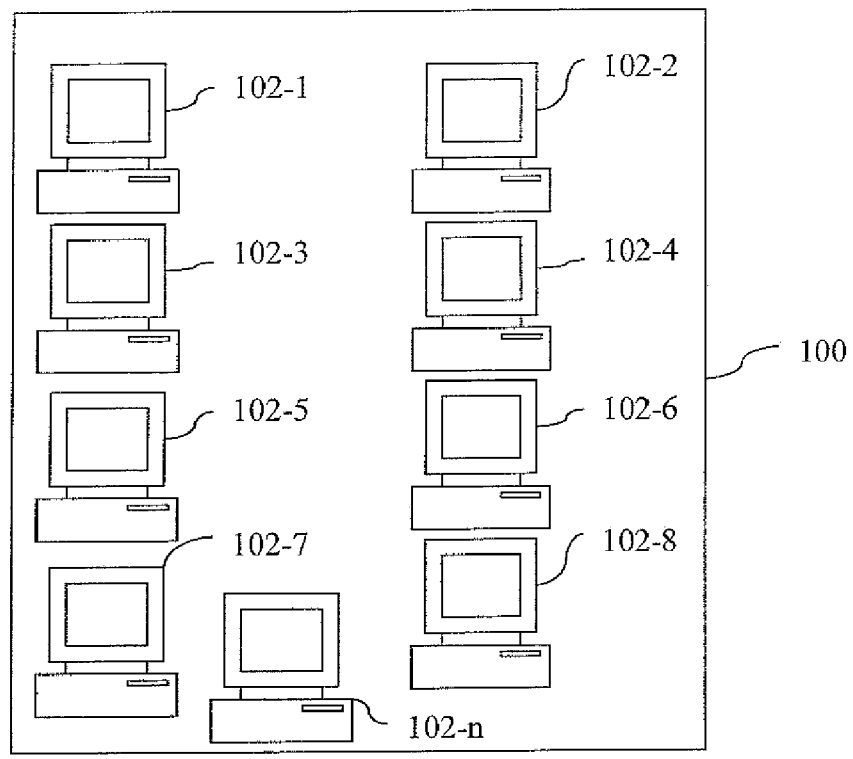
FIG. 1 illustrates a network environment of computers in which the present invention is implemented.

Directing attention to FIG. 1, there is shown network environment 100 in which a plurality of computers 102-1 through 102-*n* are connected. In the preferred embodiment, environment 100 is a local area network maintained by a server computer (not shown) having control over individual connections to network 100, and possibly providing access to remotely-located computers and/or networks. It is contemplated that network 100 allows users to connect with very little or no scrutiny at all, so that each user of computers 102 is responsible for his or her desired security level.

Figure 2:
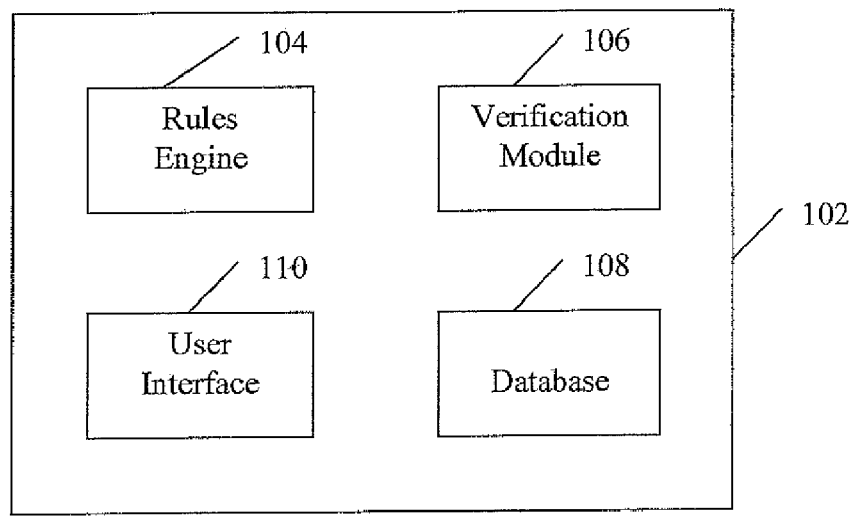
FIG. 2 illustrates major functional components used in various embodiments of the present invention.

In addition to hardware and software components found on conventional computers such as desktop computers, and portable computers such as laptops, palmtops, and the like, computer 102 incorporates the functional modules shown in FIG. 2. Rules engine 104 manages access granted to requesting users by applying one, some, or all conditions specified by the user of computer 102 to an electronic calling card that accompanies a received request. In an embodiment, verification module 106 is invoked to inspect and verify identity indicia contained in the calling cards. In an embodiment, the identification indication is issued by a third party that is an authority that confirms user identity and issues a trustable indication of the user's identity. However, such an identification indication can also be verified through a variety of methods, such as public key/private key schemes such as employed by Kerberos systems. Verification module 106 can be invoked by rules engine 104 to verify an identity key supplied by a user in an electronic calling card that the user sends to computer 102 to request access. In an alternative embodiment, verification module 106 can review the received calling card and invoke rules engine 104 to determine if conditions for access are present in the calling card. In another embodiment, a key distribution center (not shown) accommodates verification modules 106 resource requests to assist in authenticating the user associated with the calling card.

Computer 102 also includes database 108, which can be used for tracking access requests as well as accounts created for requesting entities. Directing attention to FIG. 3, user interface 110 is a module that allows the user to configure varying combinations of conditions that are checked in incoming calling cards. In an embodiment, interface 110 also allows the user to create and edit his or her calling card, by inserting an identity indicia and/or information items that serve as conditions for establishing an account and gaining access to resources on another computer. Interface 110 is divided into two functional interfaces. Incoming introduction interface 112 relates to a user-configurable set of controls, or policies that are applied by rules engine 104 to incoming introductions. Calling card configuration interface 114 allows the user to configure a set of controls, conditions or policies that are applied by rules engine 104 to the calling card the user will present in introductions to server 104.

Figure 3:
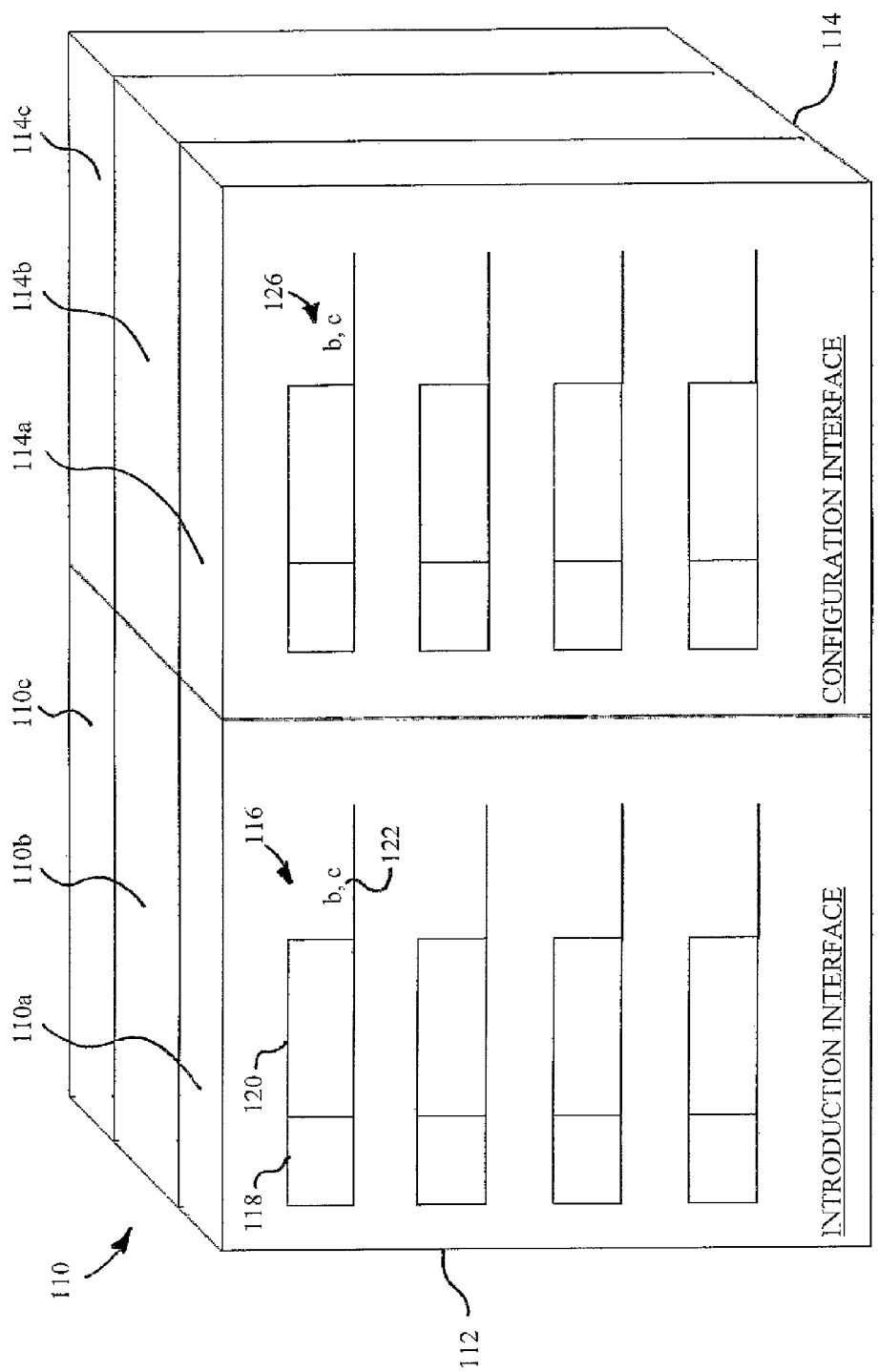
FIG. 3 illustrate user interface components that allow a user to manage and edit conditions that are applied by a rules engine to incoming calling cards as well as manage and edit conditions that determine what information is displayed on a calling card.

As illustrated, interface 110 comprises a representation of individual objects having various embodiments. For example, object 116 contains an on/off toggle 118, a condition description 120, and reference value 122. On/off toggle 118 simply makes the object available to rules engine 104. Condition display 120 includes some indicia that inform a user of the nature of the condition. Many different indicia are possible. For example, a written description may be used in one embodiment, an image in another embodiment, animated graphics displayed in another embodiment, etc. Reference value 122 contains references to additional rules on object 116 as desired by the user. As illustrated in FIG. 3, and considering interface 110 to include a plurality of templates 110*a*, 110*b*, 110*c*, etc, additional versions of interface 110 can be organized in sequence to allow rule engine 104 to execute a sequence of rules and display the sequence of rules displayed over a sequence of templates (referenced in reference value 122 as belonging to templates 110*b* and 110*c*). In some cases the sequence of rule application and can occur over time periods specified by the user, or by events triggered by a rules engine belonging to the contacted machine, to the same condition described in condition display 120 on templates 110*b* and 110*c*.

As described above, object 116 can be used for a wide variety of conditions, rules, and the like to be used by rules engine 104 to determine whether or not to grant access and/or resources to the sender of the calling card, or to simply determine whether or not to add the identity of the calling card's presenter to a trusted identity database. In is contemplated that frequency of contact initiation be represented by object 116, so that a user can configure rules engine 104 to only allow a desired number of contacts to be evaluated over a time period.

Similarly, interface 114 includes object 126, with similar features as object 126, and may also be implemented over interface templates 114*a*, 114*b*, 114*c*, etc. Both interface 112 and 114 can be displayed simultaneously to a user as illustrated in FIG. 3, but can also appear separately if a user closes display of either interface 112 or 114. In an embodiment, it is contemplated that interface 112 and 114 are in communication with a rules database containing rules that are selected for use by the user of interface 110 and passed to rules engine 104

Figure 4:
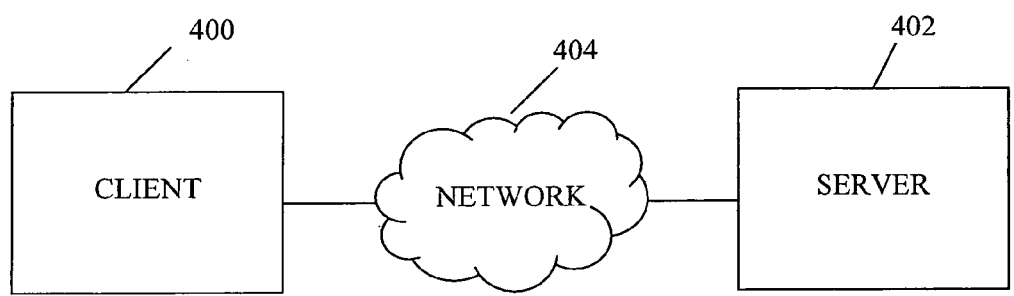
FIG. 4 illustrates communication between a client (requesting device) and server in embodiments of the present invention.

Explanation of operation of an introduction is made with reference to FIG. 4. Client 400 initiates contact with server 402 over a communication link belonging to network 404. Both client 400 and server 402 are user machines that maintain rules engines and interfaces similar to interface 110 described above. Client 400 transmits the calling card described above to server 402. In some cases, client 400 transmits the calling card only after issuing a resource request to server 402, which responds with a denial of the request. Upon sending a denial of the resource request, in embodiments where rule engine 104 operates as a background object, server 402 may initiate preparation of a rules engine similar to rules engine 104, by optimizing processing resources and reserving processor resources to apply rules engine 104 without suffering any performance degradation noticeable to a user. When server 402 receives a calling card from client 400, in an embodiment, the calling card received is examined for conditions as well as a digital certificate. Rules engine 104 can then apply authentication measures to the digital certificate, or the public key and or/private key that accompany the digital certificate. In an embodiment, rules engine 104 can pass the digital certificate to a separate authentication module (not illustrated) for separate processing. In embodiments where server 402 operates in a Kerberos environment, authentication proceeds in a domain controlled by key distribution center 105.

Depending on the evaluation of rules applied by rules engine 104, server 402 may create an identity for the user associated with client 400 and add this identity to a trusted identity database maintained by server 404. In an embodiment, server 402 harvests other information besides identity from client 400, which can be added to the identity database or associated with a log of failed access attempts, thus forming a blacklist of clients to be denied access in future instances of contact. It is contemplated that besides identity information, information such as time of the contact, the location of the contact, such as on what part of a network or what network if the user of server 404 connects to different networks. It is contemplated that a typical scenario for denial of client 400 to occur if client 400 presents a calling card bearing a bogus certificate. Besides interfacing with key distribution center 105, server 404 can also perform message integrity checks directly on the certificate and/or other parts of the received calling card.

Figure 5:
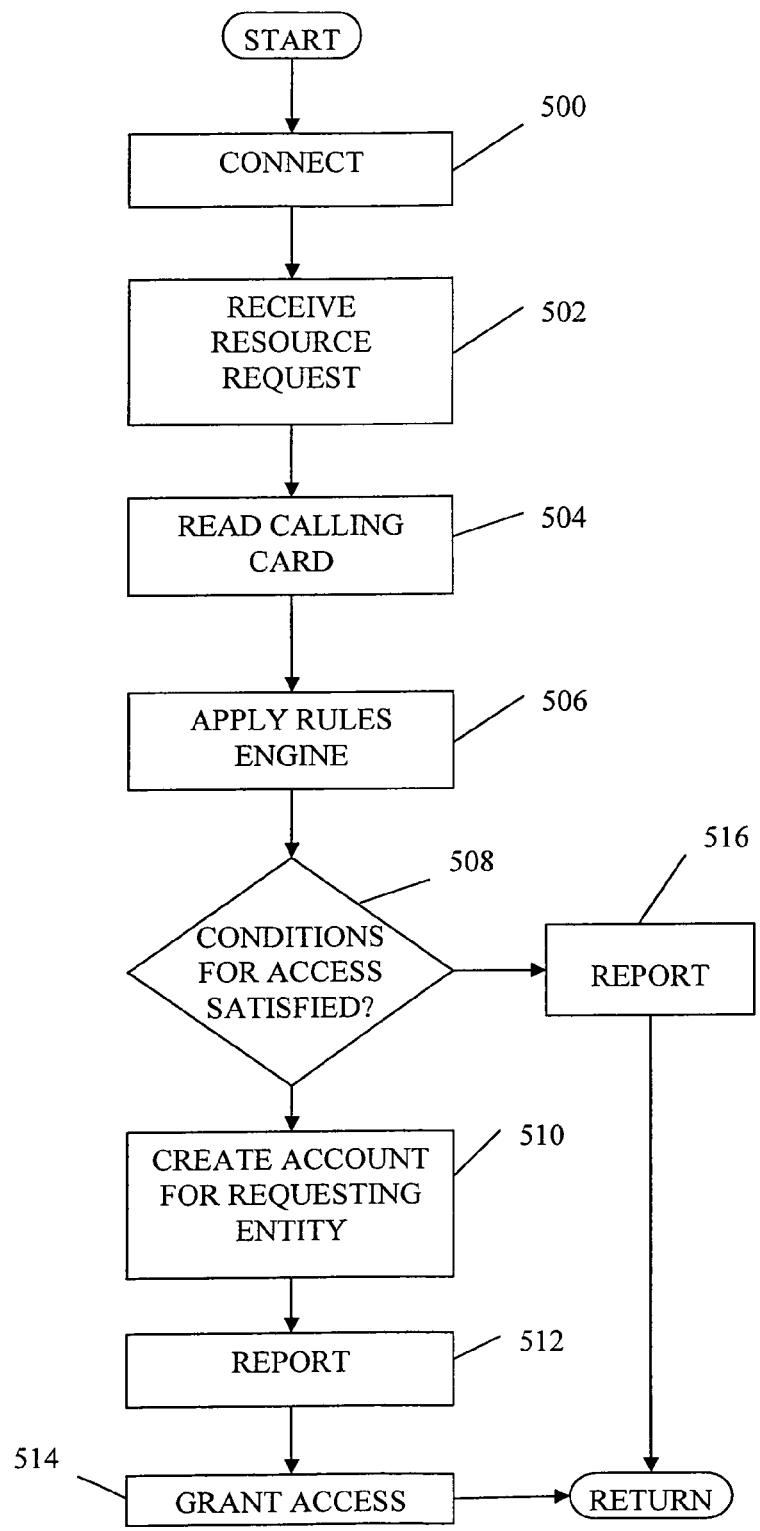
FIG. 5 and illustrates the flow of a sequence of acts performed by the server of FIG. 4.

It is contemplated that a calling card presented by client 400, in accordance with the present invention, be of the same general format or organization of a calling card that client 400 would able to receive. However, in alternative embodiments, calling cards can be made arbitrarily complex, depending on user needs. For example, different media assets could be presented in a calling card as part of a dialogue between a presentation object residing on the calling card and server 402. For example, if server 402 employs a rules engine that initially rejects the calling card presented by client 400, the rules engine maintained on client 400 may generate an updated calling card and present it to server 402 with additional information that might result in server 402 fulfilling a resource or access request made by client 400. Directing attention to FIG. 5, a sequence of acts is executed by a computer in accordance with the present invention. Beginning at act 500, a connection is established between client 400 and server 402. At act 502, server 402 receives a resource request in the form of a calling card presented by the user of client 400. As explained above, the presentation of the calling card can be triggered by server 402's rejection of an earlier resource request made by client 400. At act 504, server 402 reads the calling card, and extracts whatever information as designated by rules engine 104 located on server 402. Rules engine 104 is then applied to this extracted information at act 506, including identity information provided in a trusted token issued by an identity verification authority. Act decision step 508, a determination is made as to whether conditions for access are satisfied. If yes, an identity-based account is created on server 402 on behalf of the user of client 400. This account establishment can be reported (act 512) to other entities outside server 402, as well housekeeping or auditing programs running on server 402. Finally, at act 514, access is granted to client 400, and requested resources are allocated to client 400. Returning to decision step 508, if conditions for access are not satisfied (based on evaluation by rules engine 104), server 402 logs the unsuccessful access attempt at act 516. Unsuccessful access attempts can be evaluated by rules engine 104 in future contacts initiated by client 402.

While a method and apparatus for ad-hoc user account creation has been illustrated and described in detail, it is to be understood that many modifications can be made to the various embodiments of the present invention without departing from the spirit thereof.

The invention claimed is:

1. A method for a first computer to gain access to a second computer, the method comprising:
   executing a rules engine on the first computer, the rules engine having one or more conditions managed by a user;
   establishing a connection between the first computer and the second computer;
   sending a calling card comprising a trusted token to the second computer, the trusted token containing an identity information of the user of the first computer, where the calling card is generated by the rules engine; and
   accessing a resource controlled by the second computer, wherein the resource is accessed based on the establishment of an ad hoc user-identity for the user and is characterized by a lack of using third party resources for ad-hoc user-identity establishment at the time of establishment, the ad hoc user-identity comprising the identity information provided in the trusted token; and
   wherein the sending of the calling card causes the establishment of the ad hoc user-identity upon authentication of the trusted token.

2. The method of claim 1, wherein the trusted token comprises a token issued by an identity-verification authority.

3. The method of claim 1, wherein the trusted token identifies the user by name.

4. The method of claim 1, wherein the trusted token comprises an electronic certificate issued by an identity-verification authority.

5. A computerized apparatus, comprising:
   a network interface capable of receiving one or more requests;
   a user-identity database that stores user-identity information associated with requests received over the network interface;
   a rules engine that manages access to the computerized apparatus, the rules engine configured at least in part by a user of the computerized apparatus; and
   a processing apparatus in communication with the network interface, user-identity database, rules engine, and a storage apparatus, the storage apparatus having a plurality of instructions stored thereon which are configured to, when executed by the processing apparatus:
      receive a resource request, where the resource request comprises information associated with an other user of an external device;
      read the resource request to extract the information associated with the other user;
      apply one or more access rules governed by the rules engine module to the extracted information;
      create an ad hoc user-identity account associated with only the other user in the user-identity database configured to access the requested resource;
      store the ad hoc user-identity account for future use; and
      wherein the ad-hoc user-identity account creation is characterized by a lack of third party resource usage for ad-hoc user-identity account creation at the time of creation.

6. The computerized apparatus of claim 5, further comprising a verification module, the verification module utilized to verify an identity indicia associated with received resource requests.

7. The computerized apparatus of claim 6, wherein the identity indicia is issued by a third party, the third party comprising a user identity authority.

8. The computerized apparatus of claim 7, wherein the identity indicia comprises a trustable indication of a user's identity.

9. The computerized apparatus of claim 6, wherein the identity indicia comprises a verifiable portion of a public/private key scheme.

10. The computerized apparatus of claim 6, wherein the verification module is invoked by the rules engine module to verify the identity indicia in response to a determination that a condition for access is present.

11. The computerized apparatus of claim 5, wherein the user-identity database is further utilized to track access requests received via the network interface.

12. The computerized apparatus of claim 11, further comprising a user interface in communication with a module that allows a user of the computerized apparatus to configure one or more configurable conditions that are checked on received resource requests.

13. The computerized apparatus of claim 12, wherein at least one of the one or more configurable conditions comprises a frequency of contact initiation condition over a given time period.

14. The computerized apparatus of claim 13, wherein in response to a requesting user exceeding the frequency of contact initiation condition, the requesting user gets added to a blacklisted user list on the user-identity database.

* * * * *